United States Patent
Munce

(10) Patent No.: US 10,716,424 B2
(45) Date of Patent: Jul. 21, 2020

(54) STRAWBERRY CORE REMOVING ASSEMBLY AND METHOD

(71) Applicant: Tash Munce, Harrisburg, SD (US)

(72) Inventor: Tash Munce, Harrisburg, SD (US)

( * ) Notice: Subject to any disclaimer, the term of this patent is extended or adjusted under 35 U.S.C. 154(b) by 465 days.

(21) Appl. No.: 15/445,457

(22) Filed: Feb. 28, 2017

(65) Prior Publication Data

US 2018/0242771 A1 Aug. 30, 2018

(51) Int. Cl.
*A47J 25/00* (2006.01)
*A23L 19/00* (2016.01)

(52) U.S. Cl.
CPC .............. *A47J 25/00* (2013.01); *A23L 19/05* (2016.08); *A23V 2002/00* (2013.01)

(58) Field of Classification Search
CPC ....... A47J 25/00; A23L 19/05; A23V 2002/00
See application file for complete search history.

(56) References Cited

U.S. PATENT DOCUMENTS

| | | | |
|---|---|---|---|
| 1,390,977 A | 9/1921 | Behr | |
| 1,428,789 A | 9/1922 | Lawson | |
| 2,188,362 A | 1/1940 | Krilow | |
| 2,311,367 A * | 2/1943 | Chambers | A45D 34/04 141/20.5 |
| 3,384,963 A * | 5/1968 | Brando | A23N 4/14 30/280 |
| 4,596,073 A * | 6/1986 | Ewald | A47J 25/00 30/113.1 |
| 4,949,459 A | 8/1990 | Noble | |
| 5,092,043 A | 3/1992 | Shirkey | |
| 5,775,546 A * | 7/1998 | Buehler | B01L 3/021 222/209 |
| 5,794,344 A | 8/1998 | Poulos et al. | |
| 8,567,309 B2 | 10/2013 | Hawker et al. | |
| D722,254 S * | 2/2015 | Henry | D7/693 |
| D763,637 S * | 8/2016 | Arseneault | D7/693 |
| 9,566,379 B2 * | 2/2017 | Kutyev | A61M 3/005 |
| 2008/0271321 A1 | 11/2008 | Brunner et al. | |
| 2010/0138986 A1 * | 6/2010 | Abney | E03D 9/00 4/295 |
| 2011/0138630 A1 | 6/2011 | Tweg | |

FOREIGN PATENT DOCUMENTS

CN 202489752 10/2012

* cited by examiner

*Primary Examiner* — Anthony J Weier

(57) ABSTRACT

A strawberry core removing assembly and method includes a tube having a first end, a second end and perimeter wall extending between the first and second ends. The first and second ends are open. A bulb is in fluid communication with the tube. Air is forced out of the bulb, through the tube and outwardly of the first end when the bulb is compressed. The first end is receives a tip of a strawberry such that the tube is extended through the strawberry and a core of the strawberry is retained within the tube. The bulb is configured to be compressed to eject the core from the tube.

8 Claims, 3 Drawing Sheets

STRAWBERRY CORE REMOVING ASSEMBLY AND METHOD

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

(2) Description of Related Art Including Information Disclosed Under 37 CFR 1.97 and 1.98

The disclosure and prior art relates to strawberry coring devices and more particularly pertains to a new strawberry coring device for quickly removing the core from a strawberry.

BRIEF SUMMARY OF THE INVENTION

An embodiment of the disclosure meets the needs presented above by generally comprising a tube having a first end, a second end and perimeter wall extending between the first and second ends. The first and second ends are open. A bulb is in fluid communication with the tube. Air is forced out of the bulb, through the tube and outwardly of the first end when the bulb is compressed. The first end receives a tip of a strawberry such that the tube is extended through the strawberry and a core of the strawberry is retained within the tube. The bulb is configured to be compressed to eject the core from the tube.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
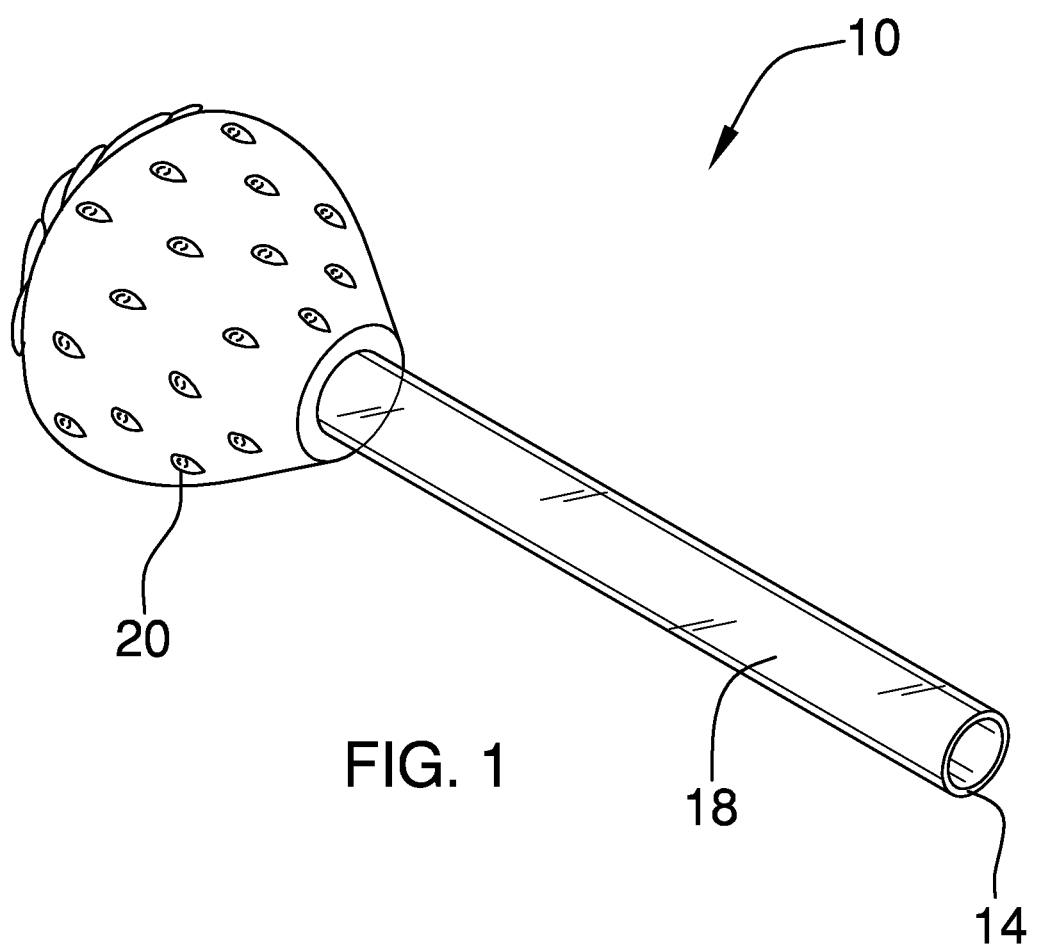
FIG. 1 is a bottom perspective view of a strawberry core removing assembly and method according to an embodiment of the disclosure.
Figure 2:
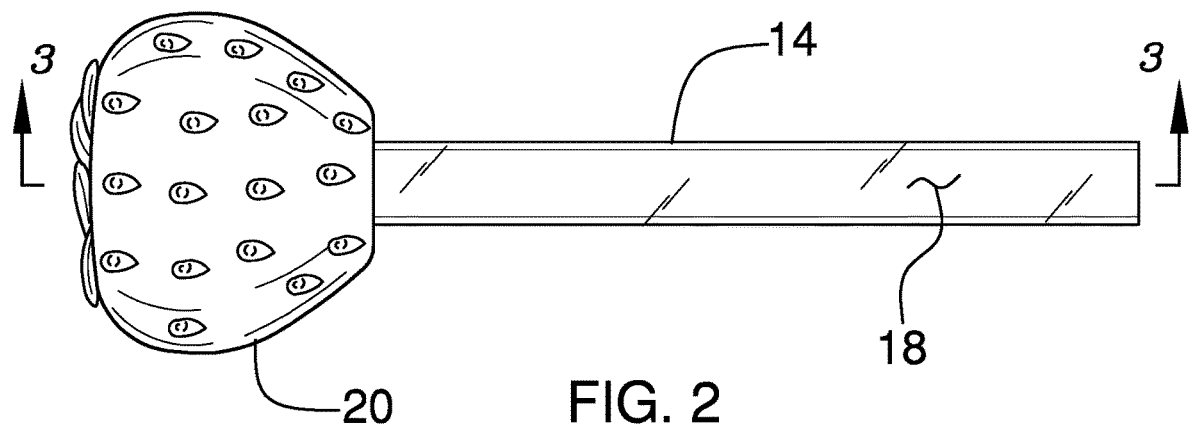
FIG. 2 is a side view of an embodiment of the disclosure.
Figure 3:
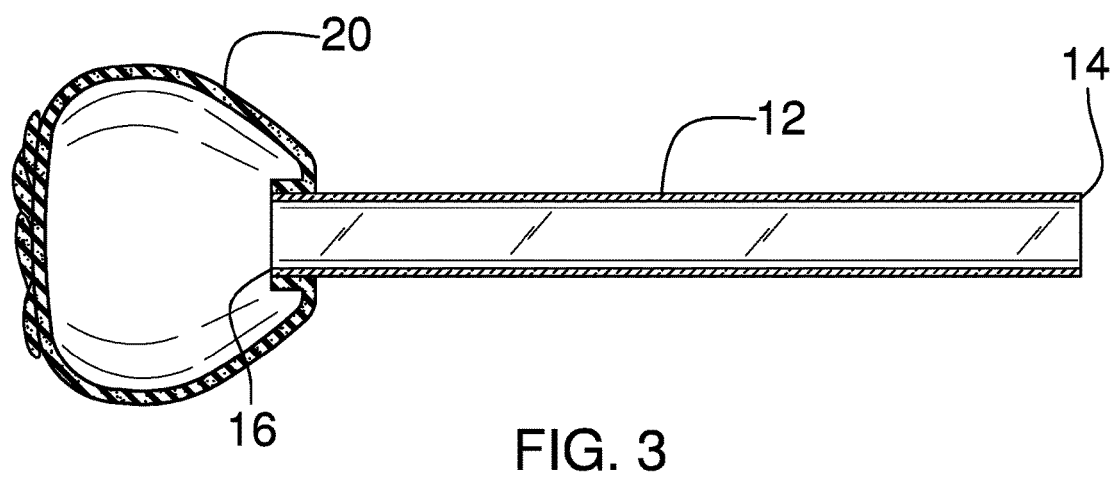
FIG. 3 is a cross-sectional view of an embodiment of the disclosure taken along line 3-3 of FIG. 2.

With reference now to the drawings, and in particular to FIGS. 1 through 5 thereof, a new strawberry coring device embodying the principles and concepts of an embodiment of the disclosure and generally designated by the reference numeral 10 will be described.

As best illustrated in FIGS. 1 through 5, the strawberry core removing assembly and method 10 generally comprises a tube 12 that has a first end 14, a second end 16 and perimeter wall 18 extending between the first 14 and second 16 ends. The first 14 and second 16 ends are open. The tube 12 may have a cylindrical shape and the tube 12 has a length from the first end 14 to the second end 16 between 1.5 inches and 6.0 inches. However, instead of a cylindrical shape, the tube 12 may be slightly larger at the second end 16 than the first end 14 and taper slightly in a funnel like manner from the second end 16 to the first end 14. The tube 12 has an outer diameter that is less than 0.5 inches. An interior of the tube 12 has a diameter between 0.2 inches and 0.4 inches. The perimeter wall 18 may have a uniform thickness from the first end 14 to the second end 16 such that the first end 14 is blunt. More particularly, the perimeter wall will preferably have a thickness less than 0.07 inches. Alternatively, the perimeter wall 18 may have a thickness that tapers downwardly to the first end 14 so that the perimeter wall 18 forms a sharpened edge for cutting though this is not needed. The tube 12 may be transparent to view its interior or may be opaque and will typically be comprised of a plastic material though any rigid material may be utilized.

A bulb 20 is in fluid communication with the tube 12. Air is forced out of the bulb 20, through the tube 12 and outwardly of the first end 14 when the bulb 20 is compressed. The bulb 20 has an interior that is less than 20.0 in$^3$. The bulb 20 is comprised of a resiliently bendable material, such as a plastic or elastomeric material, wherein the bulb 20 returns to an original shape after is compressed. The shape may be any bulbous shape though the bulb 20 may be shaped and colored to resemble a strawberry as can be seen in FIG. 1 though other shapes and colors may be employed. The second end 16 may be positioned within the bulb 20.

Figure 4:
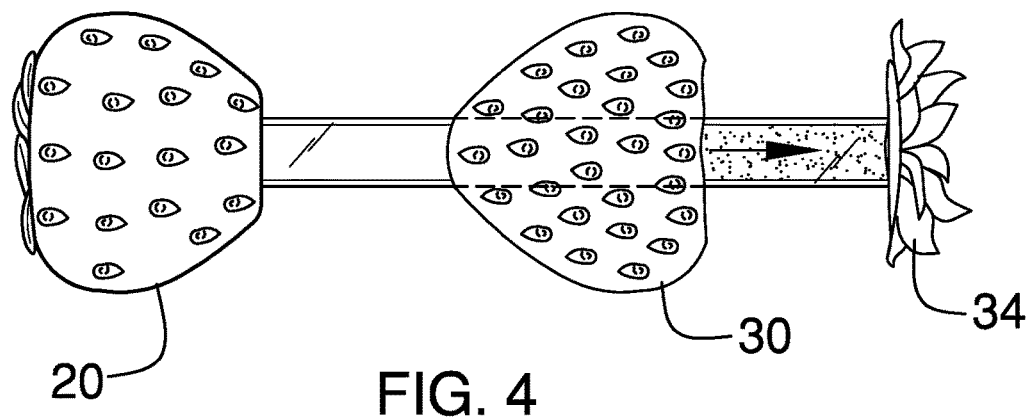
FIG. 4 is a side in-use view of an embodiment of the disclosure.
Figure 5:
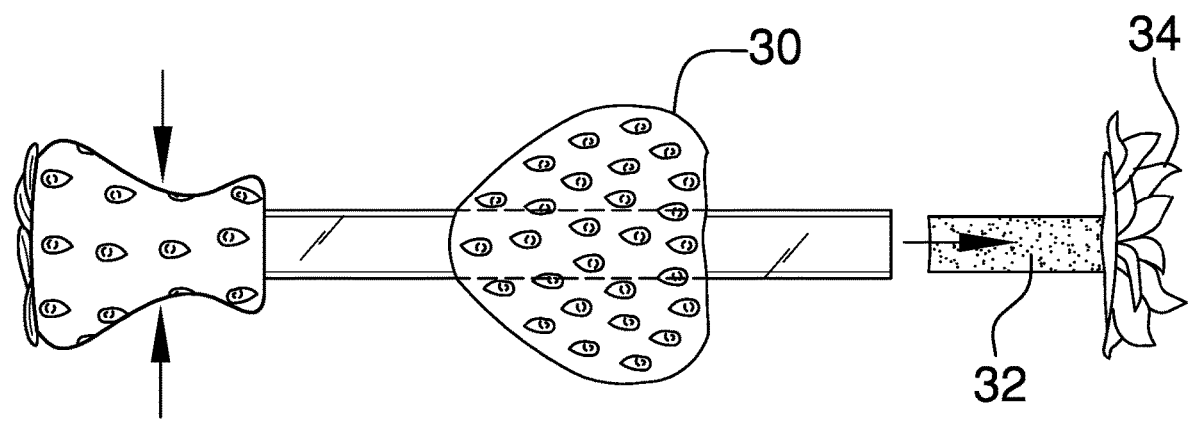
FIG. 5 is a side in-use view of an embodiment of the disclosure.

In use, the first end 14 is configured to receive a tip of a strawberry 30 such that the tube 12 is extended through the strawberry 30 and a core 32 of the strawberry 30 is retained within the tube 12. The first end 14 generally fully extends through the opposite of the strawberry such that a stem portion 34 of the core remains outside of the tube 12 adjacent to the first end 14 as shown in FIG. 4. The bulb 20 is then compressed to eject the core 32 from the tube 12. In this manner, strawberries 30 may be quickly prepared for immediate consumption while alternatively leaving an opening in the strawberries 30 that may be filled with other foods or have the core 32 replaced therein.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A strawberry coring assembly configured for removing a stem and core of a strawberry, said assembly comprising:
   a tube having a first end, a second end and perimeter wall extending between said first and second ends, said first and second ends being open, said tube having a length from said first end to said second end between 1.5 inches and 6.0 inches, said first end being a free end, said first end being flat, planar, and oriented perpendicular to a longitudinal axis of said tube;
   a bulb being in fluid communication with said tube, wherein air is forced out of said bulb, through said tube and outwardly of said first end when said bulb is compressed, said bulb having an interior being less than 20.0 in$^3$; and
   wherein said first end is configured to receive a tip of a strawberry such that said tube is extended through the strawberry and a core of the strawberry is retained within said tube, wherein said bulb is configured to be compressed to eject the core from the tube.

2. The strawberry coring assembly according to claim 1, wherein said tube has a cylindrical shape.

3. The strawberry coring assembly according to claim 1, wherein said tube has an outer diameter being less than 0.5 inches.

4. The strawberry coring assembly according to claim 1, wherein said perimeter wall has a uniform thickness from said first end to said second end.

5. The strawberry coring assembly according to claim 1, wherein said bulb is comprised of a resiliently bendable material such that said bulb returns to an original shape after being compressed.

6. The strawberry coring assembly according to claim 1, wherein said second end is positioned within said bulb.

7. A strawberry coring assembly configured for removing a stem and core of a strawberry, said assembly comprising:
   a tube having a first end, a second end and perimeter wall extending between said first and second ends, said first and second ends being open, said tube having a length from said first end to said second end between 1.5 inches and 6.0 inches, said tube having an outer diameter being less than 0.5 inches, said perimeter wall having a uniform thickness from said first end to said second end, said first end being a free end, said first end being flat, planar, and oriented perpendicular to a longitudinal axis of said tube;
   a bulb being in fluid communication with said tube, wherein air is forced out of said bulb, through said tube and outwardly of said first end when said bulb is compressed, said bulb having an interior being less than 20.0 in$^3$, said bulb being comprised of a resiliently bendable material such that said bulb returns to an original shape after being compressed, said second end being positioned within said bulb; and
   wherein said first end is configured to receive a tip of a strawberry such that said tube is extended through the strawberry and a core of the strawberry is retained within said tube, wherein said bulb is configured to be compressed to eject the core from the tube.

8. A method of coring a strawberry comprising the steps of:
   extending a first end of a tube into a strawberry such that a core of said strawberry is retained in said tube, said tube having a second end and perimeter wall extending between said first and second ends, said first and second ends being open;
   compressing a bulb, said bulb being in fluid communication with said tube, wherein air is forced out of said bulb, through said tube and outwardly of said first end when said bulb is compressed, said core being ejected from said tube when said bulb is compressed; and
   removing said strawberry from said tube.

* * * * *